Figure 1:
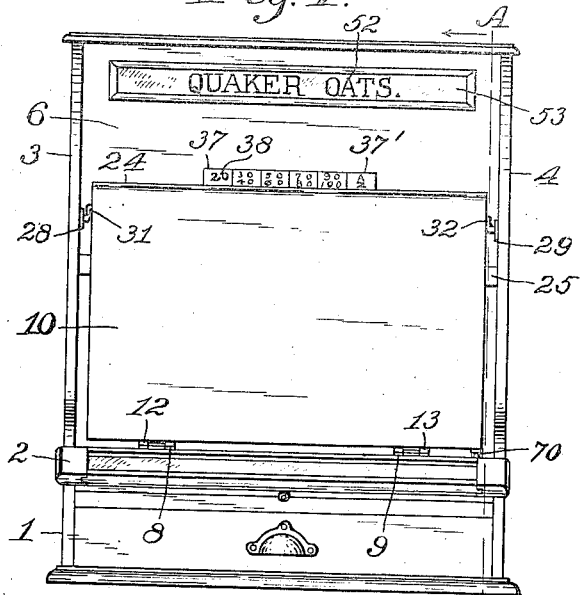

P. A. McCASKEY.
FILING APPLIANCE.
APPLICATION FILED FEB. 19, 1908.

977,961.

Patented Dec. 6, 1910.
3 SHEETS—SHEET 1.

WITNESSES:
J. H. Gardner
M. D. Beaty

INVENTOR:
Perry A. McCaskey,
BY E. T. Silvius,
ATTORNEY.

P. A. McCASKEY.
FILING APPLIANCE.
APPLICATION FILED FEB. 19, 1908.
977,961.
Patented Dec. 6, 1910.
3 SHEETS—SHEET 2.
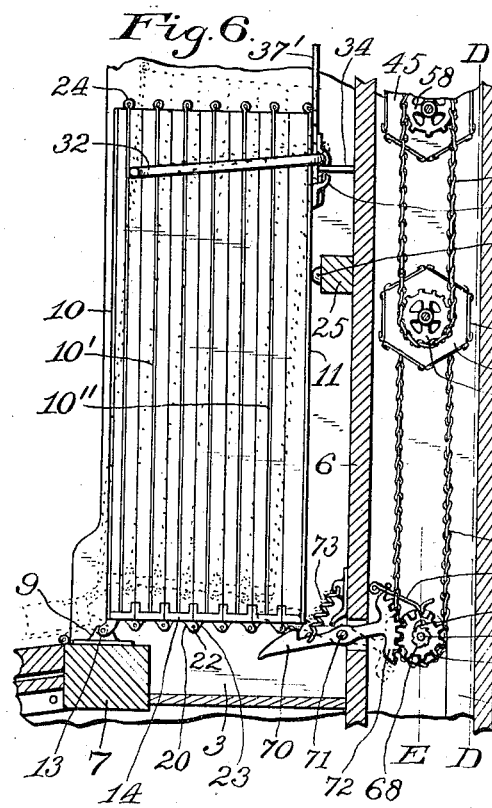
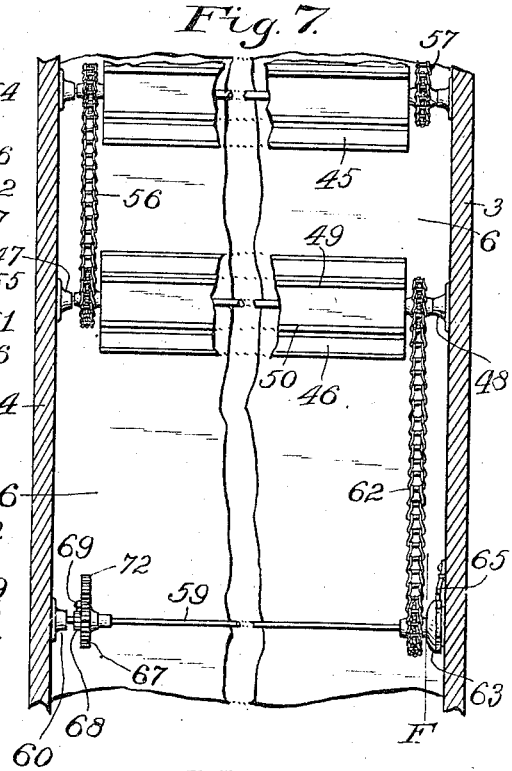
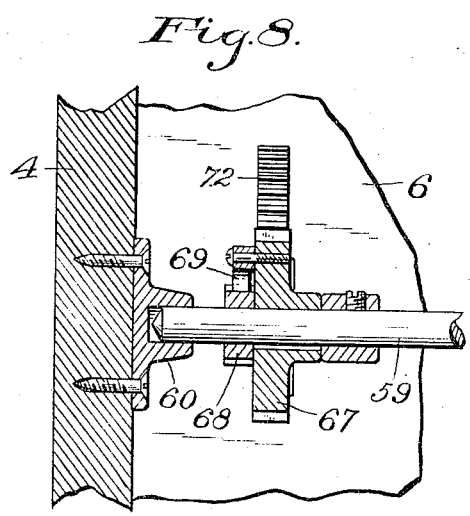
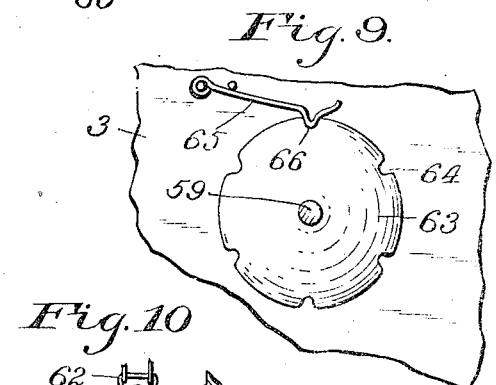
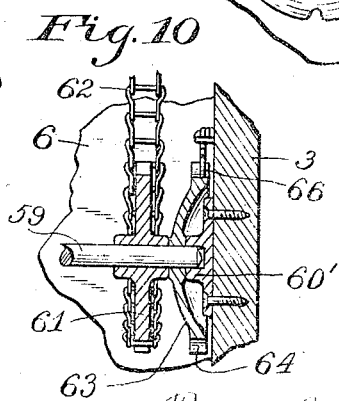
WITNESSES:
J. H. Gardner
M. D. Beaty
INVENTOR
Perry A. McCaskey,
BY
E. T. Silvius
ATTORNEY P. A. McCASKEY.
FILING APPLIANCE.
APPLICATION FILED FEB. 19, 1908.

977,961.

Patented Dec. 6, 1910.
3 SHEETS—SHEET 3.

WITNESSES:
J. H. Gardner
M. D. Beaty

INVENTOR:
Perry A. McCaskey
BY
E. T. Silvius,
ATTORNEY.

UNITED STATES PATENT OFFICE.

PERRY A. McCASKEY, OF ALLIANCE, OHIO, ASSIGNOR TO THE McCASKEY REGISTER COMPANY, OF ALLIANCE, OHIO, A CORPORATION OF OHIO.

FILING APPLIANCE.

977,961.  Specification of Letters Patent.  Patented Dec. 6, 1910.

Application filed February 19, 1908. Serial No. 416,789.

*To all whom it may concern:*

Be it known that I, PERRY A. MCCASKEY, a citizen of the United States, residing at Alliance, in the county of Stark and State of Ohio, have invented certain new and useful Improvements in Filing Appliances; and I do declare the following to be a full, clear, and exact description of the invention, reference being had to the accompanying drawings, and to the letters and figures of reference marked thereon, which form a part of this specification.

This invention relates to credit registers or filing appliances used by merchants and manufacturers in credit-accounting or filing systems, the invention having reference particularly to improvements in the registers relating to the bill holding leaves thereof and advertising devices connected with the registers or appliances.

Objects of the invention are to provide improved mechanism for guiding the top or upper edge of the rearmost bill holding leaf when the leaves have connections between them and operating, when one or more of the leaves are reclined, to move the lower edges of the remaining leaves forwardly, an object being to provide guiding means of the above-mentioned character which will not interfere with the free removal of the set of leaves from the cabinet or casing of the register; a further object being to provide improvements in the construction of the leaves and the devices for connecting them together.

Another object is to provide a simple and inexpensive advertising apparatus adapted to be operated by means of the bill holding leaves so that the merchant may display signs instructing the customer to preserve his duplicate bill slips or giving other information relating to the credit system, or to enable the merchant to advertise new goods or various articles which he may have for sale.

The invention consists in improved credit-accounting appliances and advertising apparatus connected therewith comprising a case or cabinet, a plurality of improved bill holding leaves having connections between them and pivotally supported removably in the case or cabinet, improved guiding means for the top of the rearmost leaf, one or more rotative drums mounted in the case or cabinet for displaying advertisements, and operating mechanism for the drum or drums adapted to be actuated automatically when the leaves are operated to insert or remove bill slips.

The invention consists further in the novel parts and combinations and arrangements of parts as hereinafter particularly described and defined in the appended claims.

Figure 2:
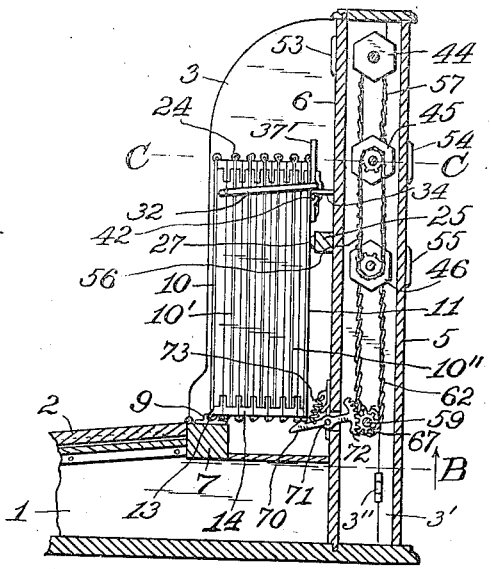
Figure 3:
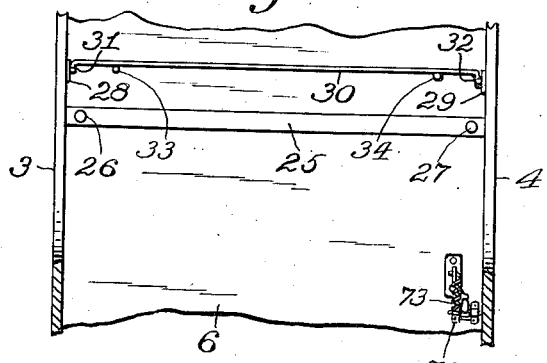
Figure 4:
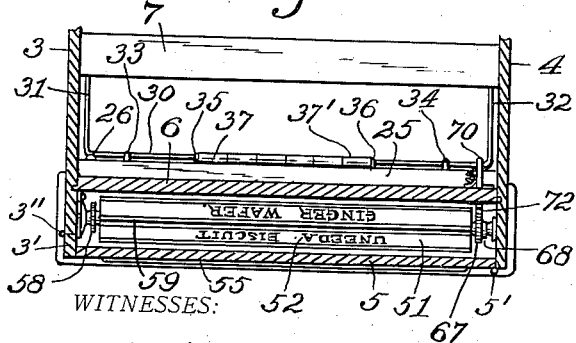
Figure 5:
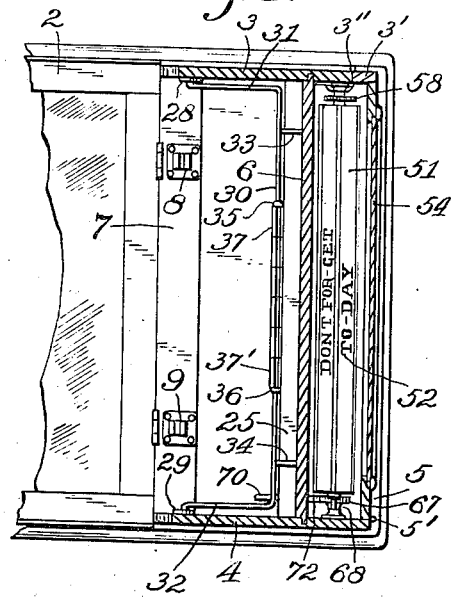
Figure 11:
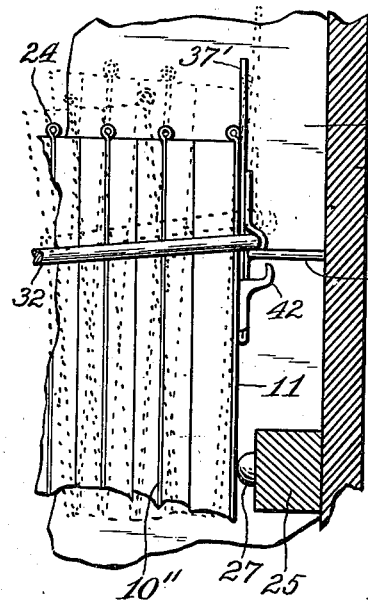
Figure 12:
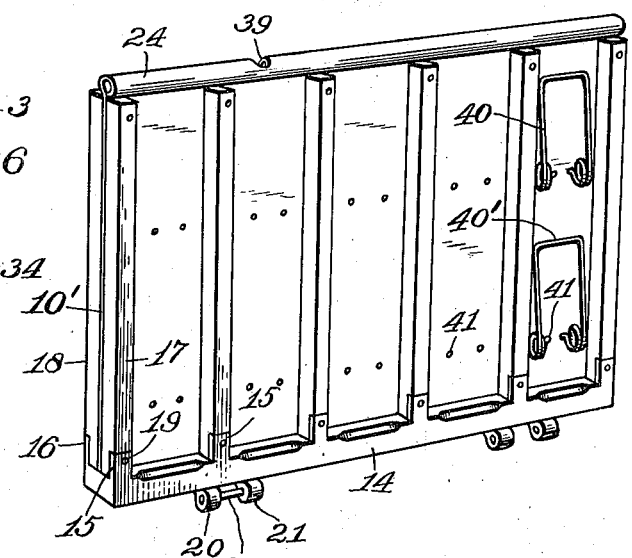
Figure 13:
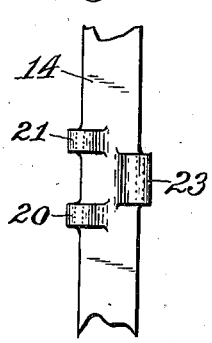
Figure 14:
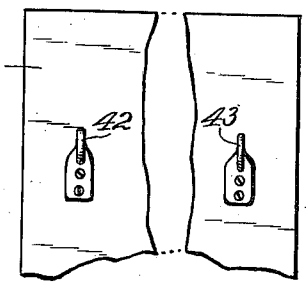
Figure 15:
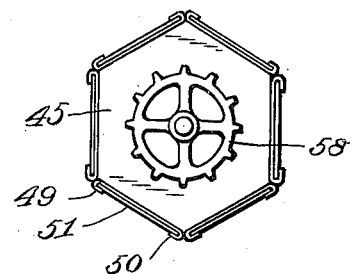
Figure 16:
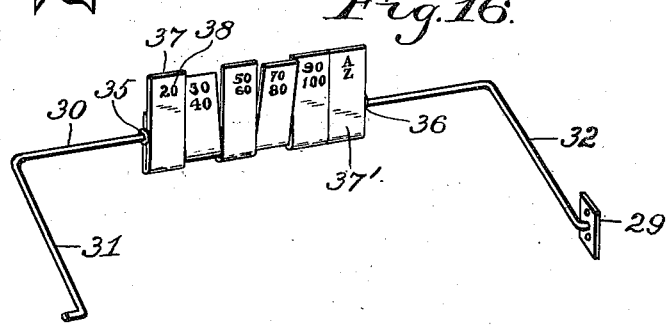
Figure 17:
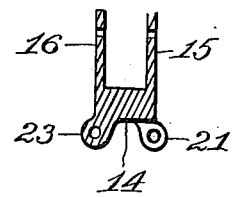

Referring to the drawings Figure 1 is a front elevation of the improved credit-accounting or filing appliance; Fig. 2, a fragmentary vertical sectional view approximately on the line A A in Fig. 1; Fig. 3, a fragmentary front elevation of the rear portion of the case or cabinet against which the bill holding leaves normally rest, the leaves being omitted; Fig. 4, a horizontal sectional view approximately on the line B in Fig. 2 looking upward; Fig. 5, a horizontal sectional view on the line C C in Fig. 2, looking downward, the leaves being omitted; Fig. 6, a fragmentary vertical sectional view approximately on the line A A in Fig. 1 showing the leaves in dotted lines as when the foremost leaf is reclining; Fig. 7, a fragmentary vertical sectional view approximately on the line D D in Fig. 6; Fig. 8, a fragmentary sectional view on the line E in Fig. 6; Fig. 9, a fragmentary sectional elevation as at the line F in Fig. 7; Fig. 10, a fragmentary vertical sectional view at the left hand side of the register on the line E in Fig. 6; Fig. 11, a fragmentary sectional view approximately on the line A A in Fig. 1, showing the leaves in dotted lines as when in two different positions; Fig. 12, a perspective view of one of the improved bill holding leaves in which a number of the bill clamps are omitted; Fig. 13, a fragmentary bottom plan view of the improved leaf; Fig. 14, a fragmentary rear elevation of the rearmost bill holding leaf; Fig. 15, an end view of either one of the advertising drums; Fig. 16, a perspective view of the leaf guide and index plates mounted thereon which comprise improvements in the present invention; and, Fig. 17, a transverse sectional view of an improved part of the bill holding leaf.

Similar reference characters in the different figures of the drawings designate corresponding elements or features of construction.

In a practical embodiment of the invention, a suitable cabinet or housing is provided comprising a desk part 1 having a top 2 on which writing may be done and on which the bill holding leaves may rest when drawn forward to reclining position, the cabinet comprising also an upright casing at the rear of the desk part and having two upright sides 3 and 4, the rear part of the side 3 being formed as a door 3' supported by hinges 3'', and a back or rear door 5 connected by hinges 5' to the side 4. An upright partition 6 joins the sides somewhat forward of the rear door 5 and serves as a back for supporting the leaves when upright, there being a chamber between the door 5 and the partition 6 in which the advertising apparatus is arranged. Any other features that may be desired may be added to the casing. A rail 7 is arranged between the sides somewhat forward of the partition 6 and has two pivot devices 8 and 9 mounted thereon. Any suitable number of bill holding leaves as 10, 10', 10'' and 11 may be connected together, and the foremost leaf 10 has two suitable pivot members 12 and 13 on its lower end that, when said leaf is in its upright position, are detachably connected pivotally to the pivot devices 8 and 9 whereby the whole group of bill holding leaves are supported in a well known manner, so that they may be drawn forward and down onto the top 2 of the desk part for inserting or removing bill slips. Preferably each intermediate bill holding leaf as 10' has a metallic hinge bar 14 that is provided with a suitable number of pairs of projecting lips 15 and 16 to which frame strips 17 and 18 are connected by rivets 19, the strips being attached also to the leaf, the frame strips of the different leaves normally engaging the strips of the adjoining leaves, so that bill slips may be held between each pair of strips, but the foremost leaf and the rearmost leaf each has strips only on one side thereof. The bar 14 of each leaf has a suitable number of pairs of hinge ears 20 and 21 at one side thereof and single ears 23 at the opposite side thereof, the ears of one leaf being connected to the ears of the adjoining leaf by hinge pins 22. All parts of the hinge bar 14 of a leaf are formed integrally as a casting, preferably of aluminum. The free end of the leaf has a tubular extremity 24 formed by rolling over the plate metal of which the leaf is preferably formed. The group of leaves, when upright, may lean against the partition 6, but the latter preferably is provided with a stop block 25 provided with rubber cushions 26 and 27 to be engaged by the rearmost leaf.

It will be clear from the foregoing that in operating bill holding leaves of the above-mentioned character, when one or more of the foremost leaves are drawn down onto the desk top 2, the remaining leaves will be elevated, and it is desirable that the tops of the remaining leaves be drawn forward substantially the same distance as their lower ends are drawn forward by the action of the forward leaves, and in order to provide a simple and inexpensive guide for the top of the rearmost leaf, a pair of pivot plates 28 and 29 are secured to the inner sides of the sides 3 and 4 of the casing and connected thereto is an operating guide preferably comprising a bar 30 and two arms 31 and 32, preferably formed integrally with the bar, the ends of the arms being pivotally connected to the pivot plates, and the bar 30 normally rests on two stop pins 33 and 34 that are mounted on the partition 6 when the leaves are upright or when the leaves are removed from the casing. The bar 30 has a pair of collars 35 and 36 suitably attached thereto, and between the collars a suitable number of index plates 37 or 37' are pivotally mounted on the bar 30, each index plate having a suitable index character 38 thereon, the index plates projecting somewhat above the rearmost leaf 11, so that the index characters may be readily seen at the front of the register. The plates bear against the rear leaf when the latter is in position in the casing, and may tilt against the partition 6 when the leaves are removed from the casing.

The free ends of the bill holding leaves have each a notch 39 to indicate which leaf is to be drawn down to gain access to any certain account in the register, the notch in one leaf being forward of one of the index plates, and the other leaves each having a notch forward of another one of the index plates, so that the account of any customer may be readily found on the leaf where it may be known to be located by means of a general index sheet heretofore used. Each leaf, as will be understood, has a suitable number of bill clips as 40 or 40' connected to the leaf in apertures 41 for holding duplicate bills on the leaves. The back of the rearmost leaf 11 has one or more fingers 42 or 43 attached thereto intermediate its opposite sides and arranged in such position as to be below the bar 30 and not in engagement therewith when the bill holding leaves are all in upright position, but when the foremost leaf or additional leaves are drawn forward, the rearmost leaf 11 will rise until the fingers engage the bar 30 and carry the bar away from the stop pins, and when the rearmost leaf rises further and consequently is drawn farther forward at its bottom, it will cause the guide to swing upward and forward, so that the tops of the leaves will be drawn forward as indicated in dotted lines in Fig. 11. When all of the leaves except the rearmost leaf, are swung into a substantially horizontal position, the said rearmost leaf is maintained in upright position by the fingers 42 and 43 engaging the bar 30. To remove the leaves from the casing, they are tilted forwardly collectively. This operation permits the fingers 42, 43 to pass under the bar 30 without disturbing it, and therefore the leaves may be removed together when occasion requires it, leaving the guide remain in the casing.

The advertising apparatus comprises a suitable number of drums as 44, 45, 46, each mounted rotatatively in a pair of journal bearings as 47 and 48 that are supported by the sides 3 and 4 of the casing, each drum having a suitable number of flat faces thereon at opposite sides of which are lips 49 and 50 that retain advertising cards 51 on which are suitable advertisements 52. The partition 6 has a glass panel 53 opposite the uppermost drum, and the rear door 5 has glass panels 54 and 55 opposite the other drums through which the advertisements on the drums may be seen by the customers of the merchant. A sprocket chain 56 connects the drums 45 and 46 together and a similar chain 57 connects the drums 44 and 45 together, so that they may be moved rotatively in unison, each drum being provided with a sprocket wheel 58 over which the chain runs. A rotative shaft 59 is mounted in the lower portion of the chamber below the lowermost drum in suitable journal bearings 60 and 60' that are supported by the sides 3 and 4, the shaft having a sprocket wheel 61 secured thereto which is connected by a sprocket chain 62 with the lowermost drum, so that all of the drums may be operated simultaneously by means of the shaft 59. A disk 63 is secured to the shaft 59 and has notches 64 in its periphery equal in number to the number of faces on either drum, a spring arm 65 being mounted on the side 3 of the casing and having a V-shaped projection 66 adapted to ride on the disk and drop into the notches or be forced out of the notches readily when the shaft 59 rotates, the purpose of the devices being to stop the drums positively in proper positions for reading the advertisements thereon in case of lost motion in any of the mechanism that operates the shaft 59, this shaft having a toothed gear wheel 67 mounted rotatively thereon, and adjacent to the wheel is a ratchet wheel 68 that is secured to the shaft, there being a pawl 69 pivoted to the wheel 67 and engaging the ratchet wheel, so that the ratchet wheel and the shaft may be rotated when the wheel 67 is moved rotatively in one direction. A lever 70 is connected to the partition 6 by means of a pivot 71 and extends through the partition, the rear end of the lever having a toothed gear-segment 72 formed thereon that engages the toothed wheel 67, the forward end of the lever extending under the rearmost leaf 11 which normally holds the lever down, the lever being retracted by means of a spring 73 when the leaf is drawn away from the lever. The arrangement and adjustment is such that when the foremost leaf 10 is drawn downward, the rearmost leaf will be elevated sufficiently to permit retraction of the lever 70, and of course retraction will be permitted when a greater number or all of the leaves are moved forward, and when the leaves or the foremost one is moved upward to the normal position, the rearmost leaf will engage and depress the lever, thus rotating the shaft 59 and therefore shifting the drums, so that at each operation of any leaf of the group, the advertisements on the drums will be shifted and thereby exposing different advertisements. The cards 51 may be readily drawn out and replaced by other cards when the door 3' is opened and the work may be facilitated by also opening the rear door 5. As may be seen in Figs. 2 and 6, the rearmost leaf has depressed the lever 70, and it is obvious that when the leaves are tilted forward the lever will be drawn upward by the spring 73, so that the lever will stand up and then be engaged and depressed when the leaves are again moved to upright position, the rearmost leaf descending upon the lever and steadily pushing it down, so that the lever by virtue of its spring acts as a cushion for the group of leaves to prevent shock or jar when the leaves assume their normal position, while at the same time serving to operate the advertising device gearing without jar.

It will be understood of course that the particular means for displaying advertisements may be variously modified and various mechanism may be employed for the operation thereof in connection with the operation of the bill holding leaves, so that the advertising apparatus will operate automatically whenever the bill holding leaves are moved in the usual course of business.

In practical use, in a credit-accounting system in which duplicate sales bills are employed, it is important that the customer retain and carefully preserve the duplicate bills presented to him with each purchase of goods that may be obtained on credit, and in order to refresh the customers' memory in this respect, it has been found desirable to employ the advertising mechanism and on one of the drums suitable cautionary notices may be displayed while advertisements of goods may be displayed on the other drums. While a customer is waiting for his bill of goods to be made out several salesmen may have operated the bill holding leaves in connection with other accounts, so that the advertising may be changed a number of times

Having thus described the invention, what is claimed as new is—

1. A filing appliance including a pivoted guide, and a plurality of leaves pivotally connected together and the foremost leaf pivotally supported, the rearmost leaf engaging and operating the guide and having its top guided thereby when one or more of the remaining leaves moves forward pivotally.

2. A filing appliance including a cabinet having a guide pivoted therein, and a plurality of leaves pivotally connected together and inserted removably in the cabinet clear of the guide, the foremost leaf being pivotally supported and supporting and carrying the remaining leaves clear of the guide, the rearmost leaf engaging and operating the guide and having its top guided thereby only when one or more of the remaining leaves moves forward pivotally.

3. A filing appliance including a cabinet, a plurality of bill-holding leaves pivotally mounted in the cabinet in upright position and movable forward to prone position, a guide mounted movably in the cabinet and comprising a horizontal bar acting, when one or more of the leaves forward of the rearmost one are moved forward, to move the upper end of the rearmost one forward, the rearmost one engaging and moving the bar, and a plate or plates mounted on the bar and carried thereby with the rearmost one of the leaves when moved and having index characters thereon.

4. A filing appliance including a plurality of bill-holding leaves having each a hinge-bar on one end thereof provided with pairs of lips and also hinging ears, the ears of one hinge-bar being pivotally connected to the ears of another adjacent hinge-bar, and frame strips attached to the leaf and also to the lips of the hinge-bar, a strip to each lip.

5. A filing appliance including a cabinet having a guide comprising a bar provided with arms pivoted to the cabinet to swing upward and forward, and a plurality of bill-holding leaves hinged together and the foremost one of the leaves supported pivotally in the cabinet, the rearmost one of the leaves engaging the bar of the guide to swing it and thereby being moved forward at its top when the rearmost leaves are elevated and moved forward at their bottoms.

6. A filing appliance including a cabinet having a guide pivoted therein, a stop mounted in the cabinet and engaged by the guide, a plurality of bill-holding leaves hinged together and the foremost one of the leaves pivotally supported in the cabinet, the rearmost one of the leaves having a projecting device to engage and lift the guide from engagement with the stop, the rearmost leaf moving the guide upward and forward and thereby being moved forward when the foremost leaves are moved forward and move the bottoms of the rearmost leaves upward and forward.

7. A filing appliance including a cabinet comprising sides and a back, a plurality of bill-holding leaves hinged together and the foremost one of the leaves pivotally supported in the cabinet to lean toward the back, a guide for the tops of the leaves comprising arms pivoted to the sides and a bar connected to the arms to be engaged by the rearmost one of the leaves, a stop in the cabinet to support the guide when not engaged by the leaf, and means for detachably connecting the bar of the guide to the rearmost leaf.

8. A filing appliance including a cabinet comprising sides, a guide comprising two arms pivoted to the sides and a bar connected to the arms, a plate pivoted on the bar of the guide and having an index character thereon, a plurality of bill-holding leaves hinged together and the foremost one of the leaves pivotally mounted in the cabinet, the rearmost one of the leaves engaging the plate and having a finger to engage the bar of the guide, and a stop pin supported in the cabinet to be engaged by the guide when the finger is disengaged from the bar, the rearmost leaf holding the plate parallel thereto.

9. A filing appliance including a cabinet comprising a back, a device for driving a display apparatus pivoted to the back, a spring connected to the cabinet and acting to force the device upward, and a plurality of bill-holding leaves hinged together and the foremost one of the leaves pivotally supported in the cabinet in normally upright position to move forward pivotally, the bottom of the rearmost one of the leaves resting upon the device and forcing it downward to operate the display apparatus.

10. In a filing appliance, the combination with a cabinet, and a plurality of bill-holding leaves mounted pivotally in the cabinet uprightly and adapted to be moved forward to prone position, of a guide comprising a bar having arms pivoted in the cabinet, a stop mounted in the cabinet and normally engaged by the guide, a plate or plates mounted on the bar of the guide and having index characters thereon, and means for moving the guide when the leaves forward of the rearmost one are moved forward to carry the bar and the plate or plates forward with the rearmost one of the leaves.

11. In a filing appliance, the combination of a series of pivotally connected bill holding leaves, means pivotally supporting the said series of leaves, and movable means, operated by the rearmost leaf, for guiding the free ends of the upright leaves forward as a preceding leaf or leaves are reclined.

12. In a filing appliance, the combination of a series of leaves hinged together, a support for the hinged leaves, and pivotally mounted means operated by one of the leaves when one or more of them are reclined, for moving the free ends of the remaining upright leaves forward.

13. In a filing appliance, the combination with a casing, of a series of leaves hinged together, a pivotal support for the leaves, and an arm pivoted to the casing and arranged to be engaged and swung upwardly by the movement of the rearmost leaf, when one or more of the leaves are reclined, to move the free ends of all the remaining upright leaves forward.

14. In a filing appliance, the combination of a series of pivotally mounted bill holding leaves adapted, when one or more of the leaves are reclined, to move forward and occupy the positions occupied by the leaves reclined, and movable means, operated by one of the leaves for moving the free ends of the remaining upright leaves forward.

15. In a filing appliance, the combination of a series of bill holding leaves, means for pivotally supporting the leaves and operating to move the rearmost leaf forwardly as the leaves are operated one by one or in groups from a substantially vertical position to a substantially horizontal position, guide means for the rearmost leaf, and means arranged forward of the said rearmost leaf of the series for pivotally supporting the said guide means.

16. In a filing appliance, the combination of a series of bill holding leaves, means for pivotally supporting the leaves and operating to move the rearmost leaf forwardly as the leaves are operated one by one or in groups from a substantially vertical position to a substantially horizontal position, guide means for the rearmost leaf, means arranged forward of the said rearmost leaf of the series for pivotally supporting the said guide means, and means carried by the rearmost leaf for operating the said guide means.

17. The combination of a casing, a series of leaves, means for pivotally supporting the leaves in the casing, a swingable member adapted for the driving of a display apparatus arranged to be operatively engaged by the rearmost leaf of the series when the said leaf is returned to normal position, and yieldable means for maintaining the swingable member in the path of the rearmost leaf and operating to stop the said rearmost leaf when it is returned to normal position.

18. The combination of a casing, a series of leaves, means for pivotally supporting the frontmost leaf in the casing, connections between the leaves permitting their pivotal movements relative to each other, the said connections operating, when one or more of the leaves are reclined, to move the lower edges of the remaining upright leaves forwardly, a movable member adapted to control the operation of a display mechanism having an arm arranged in the path of one of the leaves, and a tension device operating to maintain the movable member in the path of the said leaf.

19. In a filing appliance, the combination of a casing, a series of leaves pivotally mounted in the casing, pivotal connections between the leaves operating, when one or more of the leaves are reclined, to move the lower edges of the remaining upright leaves forwardly, and guide means operating to guide the up and down movements of the rear leaf and hold the said leaf upright when all the leaves forward thereof are reclined, including a bar supported by the casing and extending in a plane parallel to the said rearmost leaf when the latter is in normal position and a device carried by and arranged thereon between the opposite side edges of the rear leaf for making connection between the said bar and rear leaf.

20. In a filing appliance, a case including an upright back, a plurality of leaves normally arranged upright in the case opposite the back and movable therefrom to prone position, the rearward leaves being movable also upward and downward, and coöperating devices for guiding the upper end of the rearmost one of the leaves during the upward and downward movements of said rearward leaves and for positively holding the rearmost one of the leaves in upright position when the remaining leaves are moved to prone position, said devices being arranged between the back and the said rearmost one of the leaves and including an element carried solely by and arranged between the opposite ends of the rearmost one of the leaves, and an element supported by the case.

21. The combination with a case, and a plurality of bill holding leaves normally arranged in upright position in the case and movable to prone position, the rearward leaves being movable also upward and downward, of means for guiding the upper end of the rearmost one of the leaves during the upward and downward movements of said rearward leaves and for positively holding the rearmost one of the leaves against movement to prone position when the remaining leaves are so moved, said means comprising an element carried solely by the rearmost one of the leaves and arranged thereon between its opposite side edges, and another element coöperating therewith mounted in the case and extending in a plane parallel to the said rearmost leaf when the latter is in normal position.

22. The combination of a case, and a plurality of bill holding leaves normally arranged in upright position in the case and movable to prone position, the rearward leaves being movable also upward and downward, with means for guiding the upper end of the rearmost one of the leaves during the upward and downward movements of said leaves and also for holding the rearmost one of the leaves against movement to prone position when the remaining leaves are so moved, said means including a plurality of coöperating elements, one element being carried solely by the rearmost one of the leaves and another mounted in the case, the said element that is carried by said rearmost leaf extending rearwardly therefrom and arranged thereon between the opposite side edges of the said leaf.

23. The combination of a base bar having a series of pairs of projections or lips, a back or leaf having its lower edge arranged between said projections or lips, and a plurality of strips or ribs arranged at right angles to said base bar on one side of the back or leaf, each of said strips or ribs engaging at its lower end an adjacent projection or lip.

24. The combination of a base bar having a series of pairs of projections or lips, a back or leaf having its lower edge arranged between said projections or lips, a plurality of strips or ribs on opposite sides of the back, each in alinement with one on the other side of the back and each engaging at its lower end one of the said projections or lips, and a pin or nail connecting the lower ends of alined strips or ribs and the adjacent projections or lips together.

In testimony whereof, I affix my signature in presence of two witnesses, on the 8th day of February, 1908.

PERRY A. McCASKEY.

Witnesses:
   LUIS LORA,
   BERTHA VOEGELI.